(12) United States Patent
Spykerman et al.

(10) Patent No.: US 6,457,690 B1
(45) Date of Patent: Oct. 1, 2002

(54) VEHICLE ACCESSORY COMBINED HOOK AND CLIP

(75) Inventors: David J. Spykerman, Zeeland; Nels R. Smith, Holland, both of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/994,219

(22) Filed: Nov. 26, 2001

(51) Int. Cl.[7] ................................................ F16B 45/00
(52) U.S. Cl. .................... 248/305; 248/294.1; 224/313; 224/553; 24/716; 24/30.5 P; 24/543
(58) Field of Search ................................ 248/304, 305, 248/306, 308, 294.1, 339, 101; 224/313, 553, 554, 542, 557, 571; 211/96, 86.01, 123, 85.3, 106.01; 24/716, 30.5 P, 543; 296/139, 37.7, 37.8

(56) References Cited

U.S. PATENT DOCUMENTS

| | | | |
|---|---|---|---|
| 633,742 A | * 9/1899 | Turner | 248/294.1 |
| 1,292,779 A | * 1/1919 | Home | 248/294.1 |
| 3,385,547 A | * 5/1968 | West | 248/308 |
| 4,221,354 A | 9/1980 | Kempkers | 248/293 |
| 4,720,028 A | * 1/1988 | Takemura et al. | 224/553 |
| 5,411,233 A | 5/1995 | Grimes, III et al. | 248/305 |
| 5,625,921 A | 5/1997 | Smith | 16/112 |
| 6,095,469 A | * 8/2000 | Von Alman | 248/304 |
| 6,109,579 A | * 8/2000 | Huang | 248/294.1 |

* cited by examiner

Primary Examiner—Leslie A. Braun
Assistant Examiner—Gwendolyn Baxter
(74) Attorney, Agent, or Firm—Price, Henevald, Cooper, DeWitt & Litton

(57) ABSTRACT

A combined hook and clip includes a mounting housing which can be integrated into a vehicle panel or separately provided and which includes a recess for receiving a pivoted combined hook and clip. The hook and clip includes a mounting collar, which is pivotally mounted within the housing by a pivot pin, a downwardly and inwardly projecting leg extending from the mounting collar to a base. Extending integrally upwardly and outwardly from the base is a second leg which, together with the first leg and base, defines a generally U-shaped hook. Extending downwardly from the second leg and projecting below the base is a third leg with a gripper member facing the housing for defining a clip. A bias member retains the combined hook and clip within the recess of the housing and urges the clip into a gripping position.

22 Claims, 1 Drawing Sheet

VEHICLE ACCESSORY COMBINED HOOK AND CLIP

BACKGROUND OF THE INVENTION

The present invention relates to a vehicle accessory and particularly to a combined hook and clip for the temporary storage of items in a vehicle.

Many vehicles are sufficiently large to include accessory consoles, such as floor consoles mounted between front seats, armrest consoles, and the like, which may include container holders or other convenient storage areas. Additionally, vehicles frequently include accessory hooks integrated with grab handles for hanging clothing or other items. In some smaller vehicles, however, space for floor consoles is frequently unavailable. Even when present in larger vehicles, items such as women's purses, small bags such as fast food bags, or the like are frequently placed on the vehicle floor or seat for temporary storage. When seats are occupied, however, this space is unavailable for such use. There exists a need, therefore, for an auxiliary storage system which allows items, such as purses, small bags, and the like, to be conveniently positioned in a passenger compartment of a vehicle for ready access to such items, which may include parking receipts, maps or other relatively small objects.

SUMMARY OF THE INVENTION

The combined hook and clip system of the present invention satisfies this need by providing a mounting housing which can be integrated into a vehicle panel or separately provided and which includes a recess for receiving a pivoted combined hook and clip. The hook and clip includes a mounting collar, which is pivotally mounted within the housing by a pivot pin, a downwardly and inwardly projecting leg extending from the mounting collar to a base extending outwardly. Extending integrally upwardly and outwardly from the base is a second leg which, together with the first leg and base, defines a generally U-shaped hook. Extending downwardly from the second leg and projecting below the base is a third leg with a gripper member facing the housing for defining a clip. In a preferred embodiment of the invention, the mounting collar is coupled to the housing with a bias member to retain the combined hook and clip within the recess of the housing and for urging the clip into a gripping position.

In a preferred embodiment of the invention also, the combined hook and clip is integrally molded of a suitable polymeric material, such as polycarbonate, ABS, acrylic, PVC or the like, and the gripping member comprises a rubber-like material positioned on the housing-facing surface of the third leg to provide a plurality of serrated teeth, dimples, or other frictional engagement means for engagement members for gripping relatively thin items, such as the edges of a bag, parking receipts, or the like.

With such a system, the hook and clip can be integrated into, for example, the instrument panel of a vehicle, door panels, rear seat panels or to the sides of floor consoles or other locations to conveniently hold items, such as purses, fast food bags, parking receipts, or the like, without occupying space normally employed by passengers.

These and other features, objects and advantages of the present invention will become apparent upon reading the following description thereof together with reference to the accompanying drawings.

DETAILED DESCRIPTION OF THE PREFERRED EMBODIMENT

Figure 1:
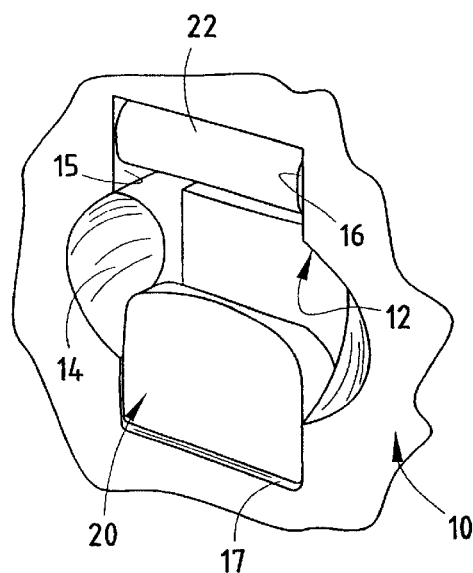
FIG. 1 is a perspective view of the combined hook and clip system of the present invention, shown in a stored position.

Referring to the figures, there is shown a panel 10 of a vehicle, such as an automobile, sport utility vehicle, truck, van or the like, which defines a housing 12 having a recess 14 for receiving the combined hook/clip 20 of the present invention. Panel 10 defining housing 12 may be the instrument panel, door panel, rear seat panel, a console side panel, or any other panel located within a vehicle for convenient access to the hook/clip 20 of the present invention. Housing 12 likewise can be a separate housing which is affixed to a surface of any of such vehicle panels utilizing a conventional attachment means, such as a bonding adhesive, double sticky tape, hook-and-loop fasteners, or threaded fasteners. In the preferred embodiment, however, the housing 12 is integrated into a vehicle panel 10 to provide a recess 14 with sidewalls 15 and 16 for the attachment of the hook/clip 20 to the vehicle.

Figure 2:
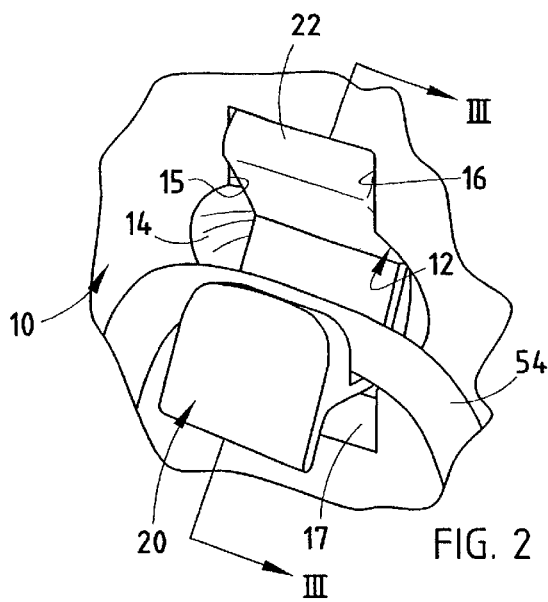
FIG. 2 is a perspective view of the combined hook and clip system of the present invention, shown in an extended position holding a bag strap.
Figure 3:
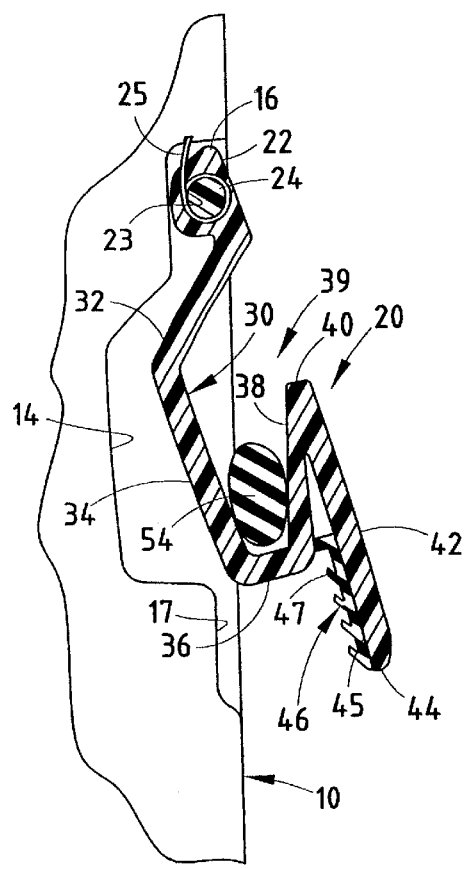
FIG. 3 is a cross-sectional view of the hook and clip, taken along section lines III—III of FIG. 2.
Figure 4:
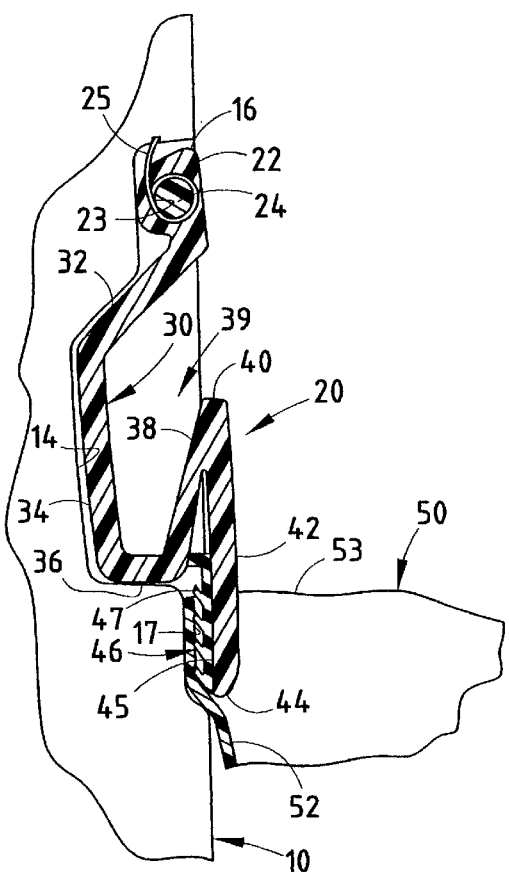
FIG. 4 is a cross-sectional view taken along the same plane as FIG. 3, shown with the combined hook and clip in a position holding the edge of a bag therein.

The hook/clip of the present invention is defined by a mounting collar 22 extending along the top of the hook/clip 20 and having a cylindrical aperture 23 (FIGS. 3 and 4) therethrough for receiving a pivot pin 24 made of steel which is treated for the automotive environment or other suitable material, which extends into the sidewalls 15 and 16 in a conventional manner to allow the hook/clip 20 to pivot between a stored position, shown in FIG. 1, and deployed, extended positions, as shown in FIGS. 2–4. A bias member 25 (FIGS. 3 and 4) urges the hook/clip 20 into the stored position shown in FIG. 1 and may comprise a coil or leaf spring or can be a resilient cam extending between the mounting collar 22 and the walls of recess 14 of housing 12 to tend to urge the clip to the stored, flush position.

As best seen in FIGS. 3 and 4, hook/clip 20 further includes a downwardly and inwardly projecting first leg 30 integral with collar 22 and defined by a first segment 32 and a second segment 34 which is integrally molded with the mounting collar 22 and which terminates in an integral, generally horizontal, outwardly extending base 36. Integrally formed with base 36 and extending upwardly and outwardly is a second leg 38 which, together with leg 30 and base 36, defines a generally U-shaped hook 39 having a tip 40 to which there is integrally formed a downwardly and outwardly extending third leg 42. Leg 42 has a tip end 44 extending below base 36 and includes on a surface facing housing 12 a gripping member 46 made of a rubber-like material, such as silicon or other material bonded to the inner surface 45 of leg 42 to provide a plurality of ridges, dimples, or other gripping elements 47 to engage, for example, the inner surface 52 of the top edge 53 of an item, such as a bag 50. As shown in FIG. 4, elements 47 grip the edge of bag 50, holding it in place within slot 17 of recess 14 and adjacent panel 10.

When hook 20 is extended to a first position, as shown in FIGS. 2 and 3, the U-shaped hook 39 can receive a handle 54 of an item, such as a purse, small bag, or the like, which is cradled within the legs 38 and 34 for holding such items at a location in the vehicle where they do not interfere with the ingress and egress of passengers or their normal space occupied during transportation in the vehicle. When moved to a second extended position, as seen in FIG. 4, the hook/clip conveniently holds thin items at readily accessible locations.

The integrated hook and clip 20 of the present invention can be integrally molded of a suitable polymeric material, such as polycarbonate, ABS, acrylic, PVC or metal, and colored and textured to conform to the interior of a vehicle. It is sized with dimensions such as a width of from about ½" to 1½" and a height of from about 1" to 3" to define a U-shaped hook having an opening of about ⅜" to ¾" for holding handles 54 of a variety of different sized purses, satchels and the like. The third leg 42 with gripping members 47 facing panel 10 may extend downwardly below base 36 a distance of from ½" to 1" to provide adequate surface area for gripping the surface of small, thin members and holding them in position within the recess 14 of housing 12. Recess 14 includes for such purpose a generally rectangular lower slot 17 to receive leg 42 when in a stored position, as seen in FIG. 1, which may assist in holding very thin items, such as the edge 52 of a bag 50, as seen in FIG. 4. The housing 12 may be integrally formed within the vehicle panel 10 during the original manufacture of a a vehicle or can be supplied as an after-market housing which can be attached to a vehicle utilizing, as noted above, conventional attachment structure.

Thus, with the system of the present invention, a conveniently located, relatively small accessory combined hook and clip is provided which is capable of holding different items at a convenient location within a vehicle for temporary storage in the passenger areas of a vehicle. It will become apparent to those skilled in the art that various modifications to the preferred embodiment of the invention as described herein can be made without departing from the spirit or scope of the invention as defined by the appended claims.

The invention claimed is:

1. A combined accessory hook and clip for a vehicle comprising:
   a mounting collar including a pivot pin extending therethrough and a generally U-shaped hook extending downwardly from said mounting collar and including a clip extension extending downwardly from an end of said U-shaped hook, wherein said mounting collar is adapted to be coupled within a housing for movement between a retracted position with the housing to one or more extended positions for exposing the hook for receiving items to be stored thereon and for presenting the clip for gripping items separately from the hook.

2. The hook and clip as defined in claim 1 wherein the U-shaped hook is defined by first downwardly and inwardly extending leg, a base and a second upwardly and outwardly extending leg.

3. The hook and clip as defined in claim 2 wherein the clip is defined by a third leg extending downwardly from the second leg.

4. The hook and clip as defined in claim 3 including a gripping member mounted to a surface of said third leg facing toward said U-shaped hook.

5. The hook and clip as defined in claim 4 including a bias member coupled between the mounting collar and pivot pin for urging the combined hook and clip into a stored position within a recess of the housing.

6. The hook and clip as defined in claim 5 which is integrally molded of a polymeric material.

7. The hook and clip as defined in claim 6 wherein the polymeric material is polycarbonate.

8. The hook and clip as defined in claim 7 wherein the polymeric material is a rubber-material.

9. A combined accessory hook and clip comprising:
   a housing defining a recess;
   a generally U-shaped hook extending downwardly including a mounting collar and including a clip extension extending downwardly from an end of said U-shaped hook; and
   a pivot pin pivotally coupling said collar to said recess wherein said mounting collar is adapted to be coupled within said housing for movement between a retracted position to one or more extended positions for exposing the hook for receiving items to be stored thereon and for presenting the clip for gripping items separately from the hook.

10. The hook and clip as defined in claim 9 wherein the U-shaped hook is defined by first downwardly and inwardly extending leg, a base and a second upwardly and outwardly extending leg.

11. The hook and clip as defined in claim 10 wherein the clip is defined by a third leg extending downwardly from said second leg.

12. The hook and clip as defined in claim 11 including a gripping member mounted to a surface of said third leg facing toward said U-shaped clip.

13. The hook and clip as defined in claim 9 including a bias member coupled between said mounting collar and said pivot pin for urging the combined hook and clip into a stored position within said recess of said housing.

14. The hook and clip as defined in claim 9 integrally molded of a polymeric material.

15. The hook and clip as defined in claim 14 wherein the polymeric material is a rubber-material.

16. A vehicle accessory comprising:
   a vehicle panel having a recess defining a housing for receiving a combined hook and clip;
   a generally U-shaped hook extending downwardly from a mounting collar and including a clip extension extending downwardly from an end of said U-shaped hook; and
   a pivot pin pivotally coupling said collar to said recess wherein said hook and clip moves between a retracted position within said housing to one or more extended positions for exposing the hook for receiving items to be stored thereon and for presenting the clip for gripping items separately from the hook.

17. The hook and clip as defined in claim 16 wherein the U-shaped hook is defined by first downwardly and inwardly extending leg, a base and a second upwardly and outwardly extending leg.

18. The hook and clip as defined in claim 17 wherein the clip is defined by a third leg extending downwardly from said second leg.

19. The hook and clip as defined in claim 18 including a gripping member mounted to a surface of said third leg facing toward said U-shaped hook.

20. The hook and clip as defined in claim 16 including a bias member coupled between said mounting collar and said pivot pin for urging the combined hook and clip into a stored position within said recess of said housing.

21. The hook and clip as defined in claim 16 integrally molded of a polymeric material.

22. The hook and clip as defined in claim 21 wherein said gripping member includes a rubber-material.

\* \* \* \* \*

UNITED STATES PATENT AND TRADEMARK OFFICE
CERTIFICATE OF CORRECTION

PATENT NO.    : 6,457,690 B1
DATED         : October 1, 2002
INVENTOR(S)   : Spykerman et al.

It is certified that error appears in the above-identified patent and that said Letters Patent is hereby corrected as shown below:

<u>Title page,</u>
Item [74], "Henevald" should be -- Heneveld --.

<u>Column 4,</u>
Lines 2, 34 and 65, remove "-".
Line 26, "clip" should be -- hook --.

Signed and Sealed this

Eighteenth Day of March, 2003

JAMES E. ROGAN
*Director of the United States Patent and Trademark Office*